United States Patent [19]

Berger

[11] Patent Number: 5,551,655

[45] Date of Patent: Sep. 3, 1996

[54] PORTABLE TRIPOD

[75] Inventor: Yossef Berger, Yuvalim, Israel

[73] Assignee: The State of Israel, Ministry of Defence, Rafael Armament Development Authority, Tel-Aviv, Israel

[21] Appl. No.: 120,276

[22] Filed: Sep. 10, 1993

[30] Foreign Application Priority Data

Sep. 18, 1992 [IL] Israel ............................................ 103212

[51] Int. Cl.⁶ ................................................. F16M 11/38
[52] U.S. Cl. ......................... 248/168; 248/169; 248/185.1
[58] Field of Search ................................. 248/168, 169, 248/166, 185, 188.91; 224/908, 153

[56] References Cited

U.S. PATENT DOCUMENTS

| | | |
|---|---|---|
| 1,728,757 | 9/1929 | Haubroe . |
| 2,282,285 | 5/1942 | Olson ............................ 248/169 |
| 2,313,593 | 3/1943 | Smith ......................... 224/908 X |
| 2,352,794 | 7/1944 | Love ............................ 248/168 |
| 2,584,713 | 2/1952 | Kanaval ..................... 248/188.91 X |
| 2,896,891 | 7/1959 | Ernst . |
| 3,144,014 | 8/1964 | Mantell, Jr. .................. 224/153 X |
| 4,348,034 | 9/1982 | Welt ............................. 298/168 X |
| 4,362,307 | 12/1982 | Nakatami .................... 224/153 X |

FOREIGN PATENT DOCUMENTS

| | | | |
|---|---|---|---|
| 1204765 | 1/1960 | France | ............................. 248/168 |
| 157705 | 11/1932 | Sweden . | |

OTHER PUBLICATIONS

U.S. Ser. No. 347,271, filed May, 1943 by Torcheux.

*Primary Examiner*—Alvin C. Chin-Shue
*Assistant Examiner*—Derek J. Berger

[57] ABSTRACT

A portable tripod of the kind in which first, second and third telescopic legs are hinged to a head portion and each telescoping leg has a fixed tubular leg member and at least one telescoping leg member slidably mounted therein. The fixed tubular members of the first and second legs are interconnected by telescoping bracing means to form a leg assembly the two legs of which have two degrees of swinging freedom. There are provided backpacking means on the leg assembly.

4 Claims, 3 Drawing Sheets

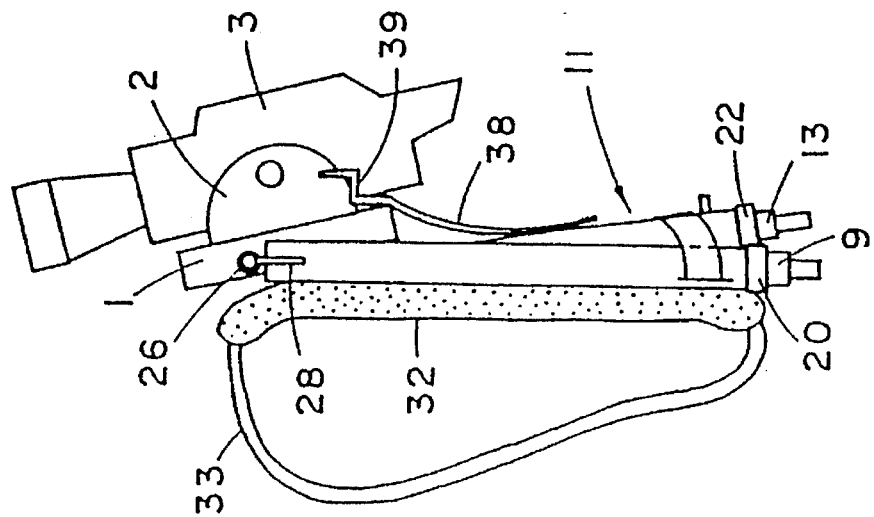
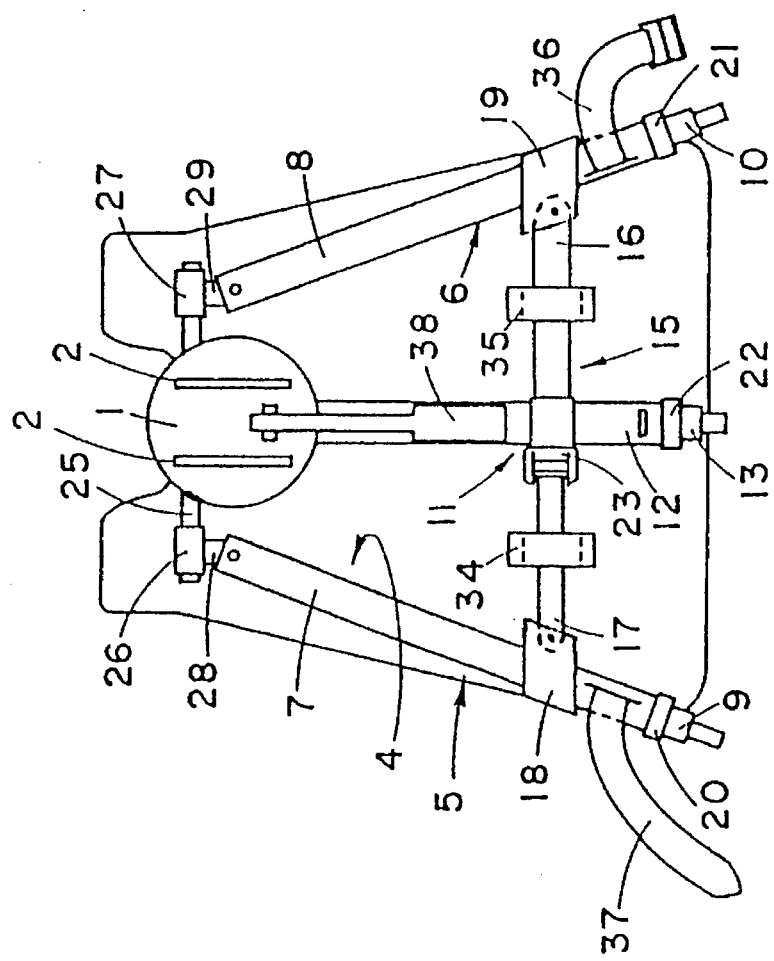

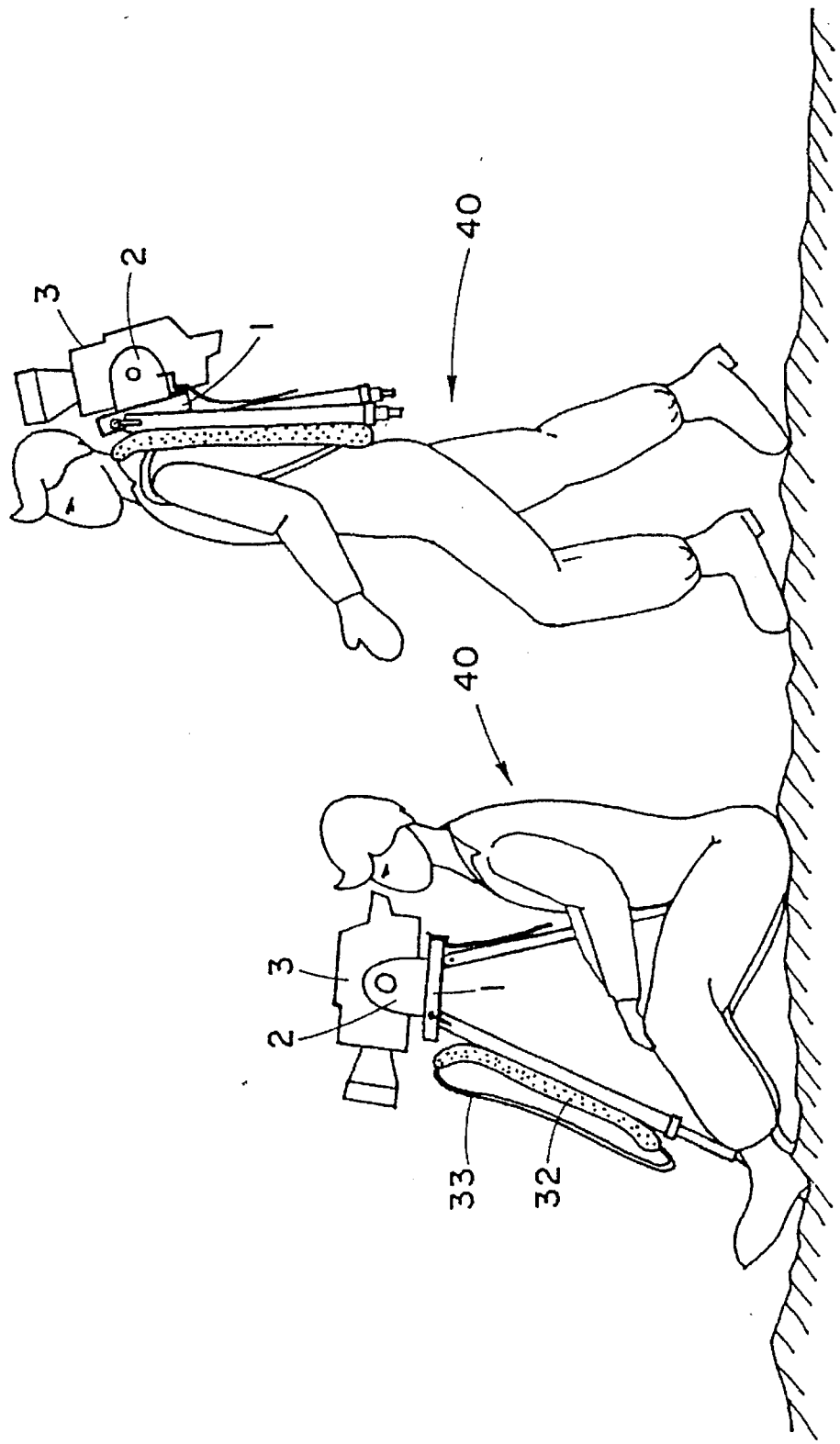

PORTABLE TRIPOD

FIELD OF THE INVENTION

The present invention relates to a portable tripod of the kind that has telescoping legs and a head portion for supporting or holding a portable device or instrument.

BACKGROUND OF THE INVENTION

Portable tripods of the kind specified are widely employed for a variety of purposes which include serving as supports for various utility devices, e.g. used in geodesy, photography, .communications and others; as supports for personal missile launchers and other combat auxiliary purposes; and the like. In such portable tripods, the three telescoping legs are each hinged individually to the head portion whereby they are foldable into a fully collapsed state in which they can readily be carried, e.g. by means of a handle, grip or a shoulder strap. For erection and deployment the three legs of the tripod are each unfolded and the telescoping parts thereof are extracted. In known portable tripods of the kind specified each of the three legs is independent of the two others and is individually folded and unfolded.

Conventional tripods have the disadvantage of being inconvenient to carry which may be a particularly acute problem in case they are designed for supporting heavy equipment, to the point that two persons may be needed for transportation. In addition, the unfolding and erection of conventional tripods and the mounting of a utility device thereon is cumbersome and time consuming which may be detrimental whenever rapid deployment is required.

SUMMARY OF THE INVENTION

Against the above background it is the object of the present invention to provide a portable tripod adapted for backpacking. It is a further optional object of the present invention to provide a portable tripod of the kind specified with a utility device permanently mounted thereon.

In accordance with the present invention there is provided a portable tripod of the kind in which first, second and third telescopic legs are hinged to a head portion and each telescoping leg has a fixed tubular leg member and at least one telescoping leg member slidably mounted therein, characterized by the fixed tubular members of said first and second legs being interconnected by telescoping bracing means hingedly linked to said fixed tubular member to form a leg assembly the two legs of which have two degrees of swinging freedom whereby said head portion is swingable between unfolded and folded states; and by backpacking means on said leg assembly on a side facing away from said third leg.

Due to the hinging linkage between the bracing means and the legs the latter can be spread and folded.

Preferably the telescoping bracing means of the leg assembly comprises means such as a catch, for snapingly locking it in the fully extended state and, if desired, also in a partially extended state.

In accordance with one embodiment of the invention a utility device is permanently mounted on the head portion whereby the deployment time is significantly shortened. In accordance with another embodiment the head portion is adapted for ad hoc mounting of a utility device thereon.

In the following the side of the leg assembly that faces away from the third leg will be referred to as the "front side" and the opposite side thereof will be referred to as "back side".

Preferably the front side of the leg assembly comprises padding means for the comfort of the bearer.

If desired, the leg assembly may be fitted with belt means by which the backpacking bearer may fasten the tripod to his waist.

DESCRIPTION OF THE DRAWINGS

For better understanding, the invention will now be described, by way of example only, with reference to the annexed drawings in which:

FIG. 1 is a rear view of a tripod according to the invention in the semi-collapsed state with the telescoping legs fully withdrawn and the utility device removed;

FIG. 2 is a side elevation of the collapsed tripod of FIG. 1 with a utility device mounted on the head portion;

FIG. 4 shows a bearer backpacking a folded tripod according to the invention with a utility device mounted on the head portion; and FIG. 5 shows the tripod of FIG. 4 in the unpacked, unfolded operative state.

DESCRIPTION OF SPECIFIC EMBODIMENTS

Figure 3:
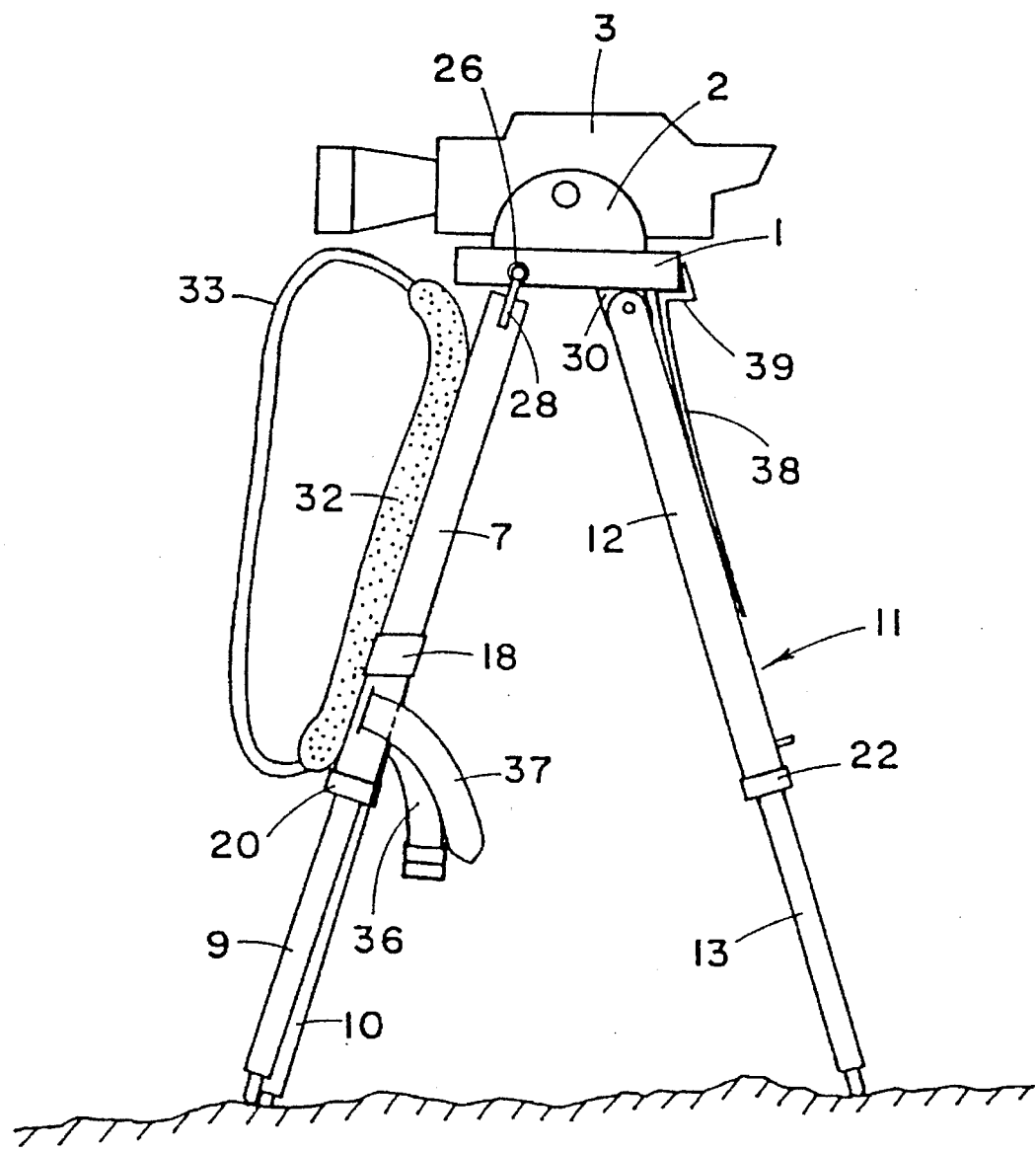
FIG. 3 is a side elevation of the tripod of FIGS. 1 and 2 in the erected state with the telescoping legs fully extended and with a utility device mounted thereon.

The embodiment of a tripod according to the invention shown in FIGS. 1–3 has a head portion in form of a flat platform 1 with a pair of brackets 2 holding a utility device 3 shown in FIGS. 2 and 3. The tripod comprises a leg assembly 4 having two telescoping legs 5 and 6 with fixed tubular leg members 7 and 8 and telescoping leg members 9 and 10. The tripod further comprises a third telescoping leg 11 with a fixed tubular leg member 12 and a telescoping leg member 13.

In FIG. 1 the legs 5 and 6 of leg assembly 4 are shown in the fully withdrawn state while at the same time being fully spread, and this state of the leg assembly 4 is referred to herein as semi-collapsed.

The leg assembly 4 has a telescoping brace 15 linking the fixed tubular leg members 7 and 8 of legs 5 and 6 and comprising a fixed tubular brace member 16 and a telescoping brace member 17. Telescoping brace 15 is hinged to collars 18 and 19 of the fixed-tubular leg members 7 and 8, respectively. All three legs 5, 6 and 11 have locking means generally shown at 20, 21 and 22 for locking the legs in the extended, operative state shown in FIGS. 3 and 5. If desired, one or more further telescoping leg members may be provided within the telescoping members 9, 10 and 13, and such further telescoping members will also be fitted with locking means similar to locking means 20, 21 and 22, all as known per se.

Brace 15 has a catch 23 for fixing it in a partially extended or the fully extended state.

A shaft 25 has its central portion rigidly attached to the platform 1 off-center thereof, and the end portions of shaft 25 are journalled in sleeves 26 and 27 and are fitted with tongues 28 and 29, respectively, of which the former is pivoted to the fixed tubular member 7 of leg 5 and the latter to the fixed tubular member 8 of leg 6, in the manner shown in FIG. 1. In this way each of legs 5 and 6 has two degrees of freedom for swinging in two planes normal to each other, whereby leg unit 4 can be folded as a whole and the legs 5 and 6 thereof may be collapsed and spread. In this way platform 1 is swingable between the collapsed state of FIGS. 1 and 2 and the erected state of FIG. 3.

The fixed tubular part .12 of leg 11 is pivoted to platform 1 at 30 in the manner shown.

A backpacking assembly consisting of a pad 32 and a pair of carrier straps 33 is secured to the front side of the leg assembly 4, i.a. by means of pliable loops 34 and 35.

A pair of straps 36 and ,37 is provided on the leg assembly 4, for tying together the three fixed tubular members, 7, 8 and 12 in the folded state.

A leaf spring 38 having an upper L-shaped end portion 39, is attached to the fixed tubular leg member 12. In the unfolded state, end portion 39 engages platform 1 whereby the later is locked and prevented from folding spontaneously.

For erecting the tripod here shown, leg 11 and leg assembly 4 are pulled apart until platform 1 snaps into the L-shaped end portion 39 of spring 38. This is followed by extracting the telescoping leg portions 9, 10 and 13, locking each of them in the extended position and spreading apart of legs 5 and 6 until catch 23 snaps into the engagement. Legs 5 and 6 can be spread apart .partially or to the full extent and the catch 23 can be manipulated (in a manner not shown) so as to snap into engagement in either state. The foregoing operations can be carried out at any desired sequence and at the end the fully erected position of FIGS. 3 and 4 is reached.

Where the utility device 3 is permanently mounted on platform 1 as here shown, the tripod is operational upon erection. Otherwise, erection of the tripod has to be followed by mounting a utility device thereon.

In FIG. 4 the bearer 40 is backpacking the folded tripod with the utility device 3 permanently mounted on platform 1, and in FIG. 5 the tripod is shown in the unpacked, unfolded and erected operational state.

If desired, a level may be provided on platform 1 as an auxiliary for ensuring horizontal positioning.

It should be noted that the manner of mounting the utility device 3 on platform 1 with the aid of brackets 2 is merely one specific embodiment and that other modes of mounting are possible such as, for example, a screw-and-nut assembly in association with a pin in either the device or the platform engaging an opposite socket or bore; a ball-and-socket joint; and the like.

I claim:

1. A portable tripod comprising a head portion; first, second and third telescopic legs hinged to said head portion, each telescoping leg having a fixed tubular leg member and at least one telescoping leg member slidably mounted therein, the fixed tubular leg members of said first and second legs being interconnected by telescoping bracing means hingedly linked to said fixed tubular leg members to form a leg assembly of the first and second legs; back packing means coupled to said leg assembly on a side facing away from the third leg to enable a tripod bearer to carry the tripod on a bearer's back; means for pivotally coupling each of the first and second legs to said head portion such that each of said first and second legs has two degrees of freedom for swinging in two planes normal to each other so that said first and second legs of the leg assembly are swingable between a collapsed position and a spread position and said head portion is swingable between a collapsed non-operating position to be carried on the bearer's back by said backpacking means and an erected operating position to be supported on said first, second and third telescopic legs; and spring means connected to the fixed tubular leg member of the third telescopic leg and having an end portion for engaging said head portion when said head portion is in said erected operating position to prevent said head portion from spontaneously moving to said collapsed non-operating position thereof.

2. A portable tripod according to claim 1, wherein a utility device is permanently mounted on the head portion.

3. A portable tripod according to claim 1, wherein the head portion is adapted for ad hoc mounting of a utility device.

4. A portable tripod according to claim 1, wherein said spring means includes a leaf spring.

* * * * *